L. B. THOMAS.
COMBINED MEASURING AND DISPENSING BIN.
APPLICATION FILED JAN. 9, 1913.
1,090,764.
Patented Mar. 17, 1914.
2 SHEETS—SHEET 2.
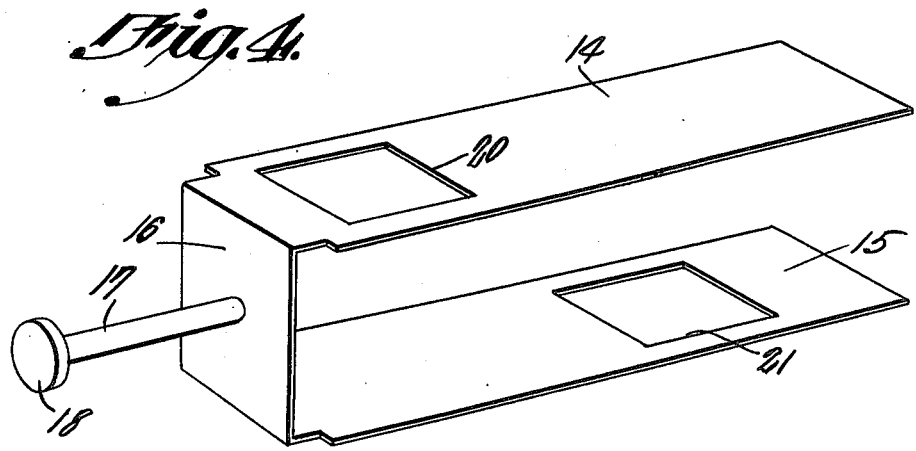
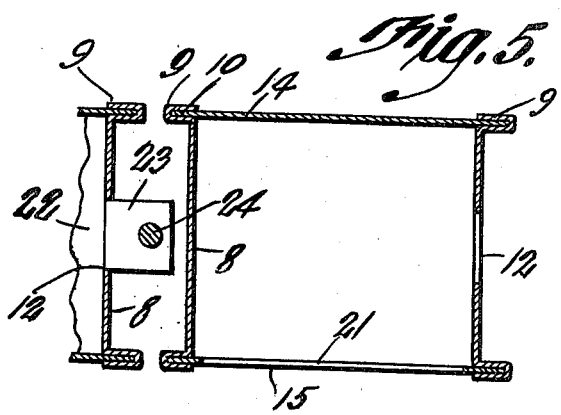
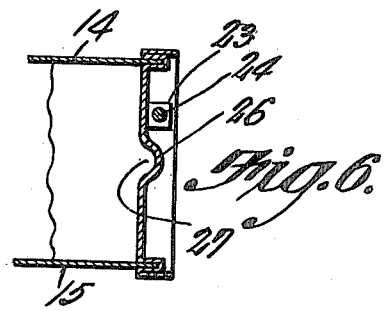
Witnesses
Luther B. Thomas
Inventor
by
Attorneys

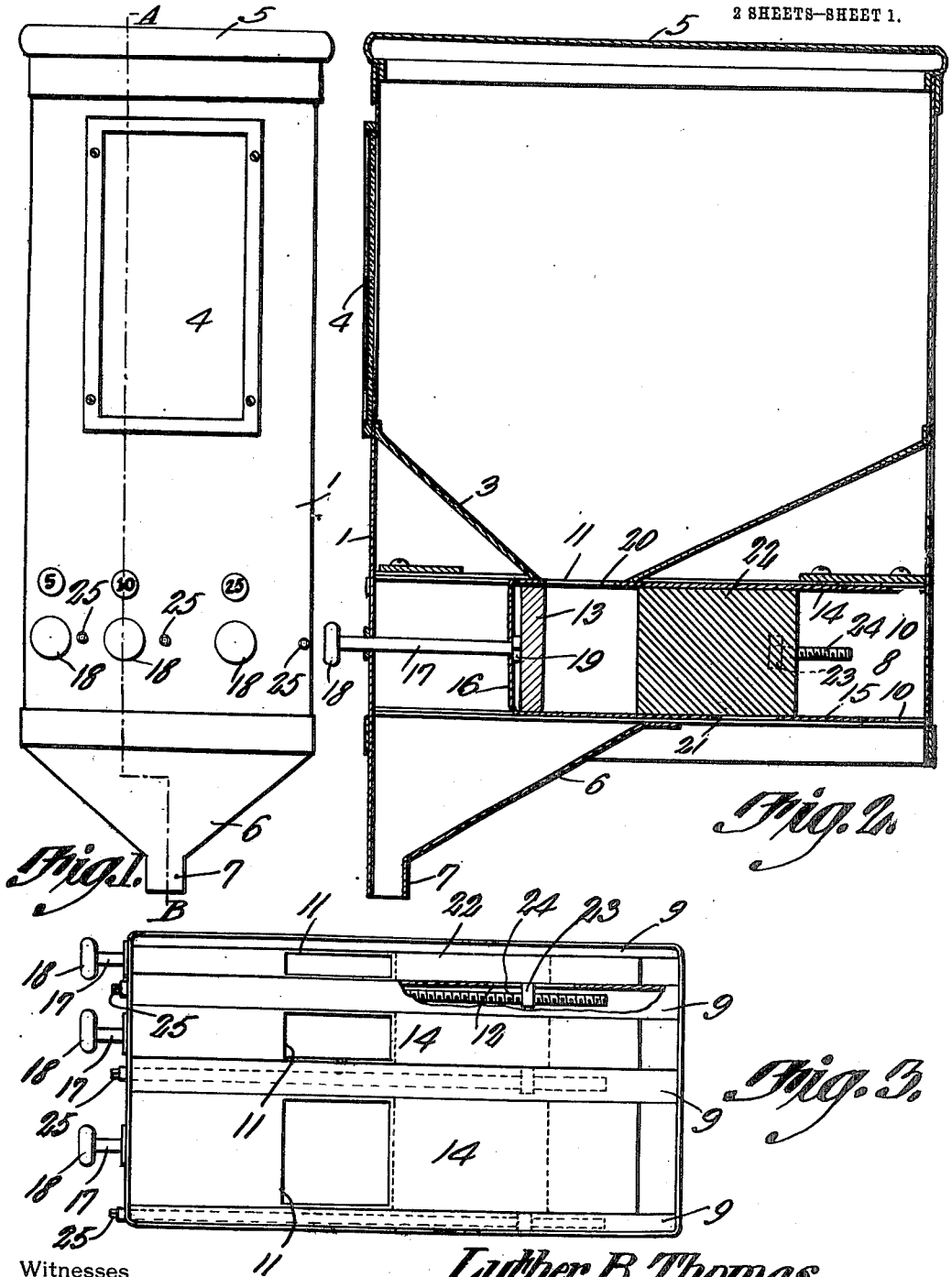

UNITED STATES PATENT OFFICE.

LUTHER B. THOMAS, OF SHREVEPORT, LOUISIANA, ASSIGNOR OF ONE-TENTH TO J. M. ROBINSON, OF BAYOU LA CHUTE, LOUISIANA.

COMBINED MEASURING AND DISPENSING BIN.

1,090,764.

Specification of Letters Patent. Patented Mar. 17, 1914.

Application filed January 9, 1913. Serial No. 741,122.

*To all whom it may concern:*

Be it known that I, LUTHER B. THOMAS, a citizen of the United States, residing at Shreveport, in the parish of Caddo and State of Louisiana, have invented a new and useful Combined Measuring and Dispensing Bin, of which the following is a specification.

This invention relates to combined measuring and dispensing bins, one of its objects being to provide a simple, compact, and efficient device of this character having a stationary adjustable measuring compartment interposed between the bulk holder and the outlet chute, there being coöperating cut-off devices movable relative to the compartment and whereby material is admitted to the measuring compartment and is subsequently permitted to gravitate therefrom.

Another object is to provide a novel controlling means which can be easily operated.

Another object is to provide improved means for adjusting the measuring compartment to any desired size.

A further object is to provide a device of this character which is cheap to manufacture, but which presents an attractive appearance.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred forms of the invention have been shown.

In said drawings: Figure 1 is a front elevation of the combined measuring and dispensing bin. Fig. 2 is a section on line A—B Fig. 1. Fig. 3 is a plan view, the cover being removed, and a portion of the bottom of one of the bulk holders being broken away. Fig. 4 is a perspective view of the controlling slide. Fig. 5 is an enlarged vertical transverse section through one of the slides and a portion of an adjoining one, the side walls or guides of the slides being shown and a portion of one of the adjustable blocks being also illustrated. Fig. 6 is a vertical transverse section through a modified form of guide and through a portion of the slide engaging it.

Referring to the figures by characters of reference 1 designates a casing and this casing may be divided, by upwardly extending partitions, into separate bulk holders 2 each of which may be provided with a hopper-like bottom 3 while a glass front 4 may be employed so as to permit the contents of the various bulk holders to be viewed. A closure 5 is removably mounted upon the casing 1 and serves to protect the contents of the bulk holders from dust and moisture.

Extending downwardly from the bottom of the casing 1 is a discharge hopper 6 which extends transversely under all of the bulk holders and serves to direct material to an outlet spout 7 extending downwardly therefrom. Interposed between the hopper 6 and the bottoms of the bulk holders are parallel guide plates 8, each plate having its upper and lower edges folded and bent laterally, as shown at 9, so as to provide channels 10 extending throughout the length of the plate. The plates 8 are arranged in pairs and the outlet openings 11 in the bottoms of the bulk holders are adapted to discharge material between the plates of the respective pairs. One plate 8 of each pair is preferably formed with a longitudinal slot 12.

Extending transversely between and secured to the plates 8 of each pair is a fixed block 13 located under the front end of the adjacent opening 11. Extending over and under each block are the upper and lower leaves 14 and 15 respectively of the cut-off slide, these leaves being preferably formed in a single strip of sheet metal connected by an intermediate end plate 16. A pull rod 17 may be extended from the center of this plate 16 and through the front of the casing 1, this rod being provided at its outer end with a knob 18 and at its inner end with a head 19, said head serving to prevent the rod from pulling out of the plate 16. Formed in the upper leaf 14 is an opening 20 adapted normally to register with the outlet opening 11. Another opening 21 is formed in the lower leaf 15 and is so positioned that, when opening 20 is in register with opening 11, the opening 21 will lie back of the hopper 6 and back from under the opening 11. The normal positions of the openings 20 and 21 have been illustrated in Fig. 2.
Mounted between the guide plates 8 of each pair and also between the leaves 14 and 15 of the cut-off is an adjustable block 22 which fits snugly against the leaves and the guide plates and may be provided, on one side, with an ear 23 slidably mounted within the adjacent slot 12. The opening 21 is normally positioned under this cut-off block as shown in Fig. 2.

Ear 23 is engaged by an adjusting screw 24 which extends forwardly within the space between two adjoining pairs of guide plates 8 and is swiveled in the front of the casing 1. This screw has a head 25 at its front end which is adapted to be engaged by a suitable tool provided for that purpose and thus rotated so as to cause block 22 to slide toward or away from the stationary block 13. In this manner the capacity of the measuring compartment which is formed between the two blocks can be increased or diminished. It is to be understood of course that the slot 12 is always located back of the opening 20 so as always to be covered by the block 22.

As hereinbefore stated, when the rod 17 is pushed back so as to bring the slide in its normal position, the opening 20 registers with the outlet opening 11 while opening 21 is positioned under the block 22 and thus closed thereby. Obviously, therefore, a portion of the contents of the bulk holder will gravitate into and fill the space between the blocks 22 and 13 and the guide plates 8. When it is desired to eject the contents of the measuring compartment, the operator pulls on the knob 18. Thus the leaves 14 and 15 are drawn forward, the opening 20 being moved from under the opening 11 and as soon as said opening 11 is thus closed, the opening 21 moves into position over the hopper 6 so that the material which has accumulated within the measuring compartment will thus be free to gravitate into the hopper 6 and be discharged through spout 7 into a suitable receptacle provided for it.
By means of the screw 24, block 22 can be adjusted so as to increase or diminish the size of the measuring compartment, thus to adapt the device for use in connection with different kinds of materials. For example a compartment containing one pound of one material would be too large or too small to hold one pound of some other kind of material and, therefore, this adjustment is necessary in order that the device can be arranged for use with different materials as stated.

If desired, and in order to relieve the leaves 14 and 15 of the frictional contact of block 22 therewith, each of the guide plates 8 may be provided with a longitudinal channel, such as shown at 26, this channel receiving a rib 27 formed on the side of the block 22. Therefore the rib and channel coöperate to guide and support the block and relieve the lower leaf 15 of the weight of the block.

In constructing a device of this character with two or more bulk holders, it is preferred to make the bulk holders of different widths as shown in Fig. 3.
What is claimed is:—

1. A combined measuring and dispensing bin including a bulk holder having an outlet in the bottom thereof, guides below and at opposite sides of the outlet, a stationary member mounted between and supported by the guides and constituting one wall of a measuring compartment, said member being located adjacent one edge of the outlet, a movable member interposed between the guide members and constituting another wall of the measuring compartment, means accessible outside of the bin for adjusting the movable member and a slide including upper and lower leaves extending above and below said members respectively, a head connecting the leaves, and an actuating device connected to the head, said leaves having openings therein, the opening in the upper leaf normally registering with the outlet of the bulk holder and the opening in the lower leaf being normally closed, said leaves being shiftable to bring the openings successively to position to close the outlet and to open the bottom of the measuring compartment.

2. A combined measuring and dispensing bin including a bulk holder having an outlet in the bottom thereof, guide plates below and at the sides of the outlet, said plates having upper and lower guide channels, leaves slidably mounted within the channels, a connection between the leaves, an actuating device extending from said connection, a stationary member extending between the leaves and connected to and supported by the guides, said member constituting one wall of a measuring compartment, a movable member extending between the guides and the leaves and constituting another wall of a measuring compartment, and means accessible outside of the bin for adjusting the movable member, said leaves having apertures therein, the aperture in the upper leaf normally registering with the outlet and the aperture in the lower leaf being normally closed, said leaves being shiftable in one direction to successively close the outlet and open the bottom of the measuring compartment.

In testimony that I claim the foregoing as my own, I have hereto affixed my signature in the presence of two witnesses.

LUTHER B. THOMAS.

Witnesses:
W. L. GEORGE,
E. G. DOUGLASS.